United States Patent [19]
Komori et al.

[11] Patent Number: 5,887,976
[45] Date of Patent: Mar. 30, 1999

[54] CONTINUOUS KNEADING MACHINE HAVING AT LEAST ONE ROTATING SHAFT AND PADDLES AND NOTCHED ADJUSTING PLATES MOUNTED ON EACH SHAFT

[75] Inventors: Toshihisa Komori, Okazaki; Reiki Murakami, Toyokawa; Toshihiko Takayanagi, Toyohashi, all of Japan

[73] Assignee: Sintokogio, Ltd., Nagoya, Japan

[21] Appl. No.: 952,389

[22] PCT Filed: Apr. 11, 1997

[86] PCT No.: PCT/JP97/01257

§ 371 Date: Feb. 23, 1998

§ 102(e) Date: Feb. 23, 1998

[87] PCT Pub. No.: WO97/39867

PCT Pub. Date: Oct. 30, 1997

[30] Foreign Application Priority Data

Apr. 19, 1996 [JP] Japan ..................................... 8-122498

[51] Int. Cl.⁶ .................. B01F 7/04; B01F 15/02
[52] U.S. Cl. .......................... 366/195; 366/298; 366/301; 366/326.1; 366/328.1
[58] Field of Search ............................ 366/64–67, 96–99, 366/102–104, 152.6, 194–196, 285, 316, 297–301, 326.1, 328.1, 329.1

[56] References Cited

U.S. PATENT DOCUMENTS

| 3,293,117 | 12/1966 | Pennington, Jr. et al. .......... 366/328.1 |
| 3,689,035 | 9/1972 | List . |
| 3,730,486 | 5/1973 | Hayashi et al. ...................... 366/328.1 |
| 3,823,921 | 7/1974 | Brennan, Jr. et al. . |
| 4,589,215 | 5/1986 | Iwasaki et al. . |
| 4,887,911 | 12/1989 | Miyaji ................................. 366/328.1 |

FOREIGN PATENT DOCUMENTS

| 0 144 092 | 2/1976 | European Pat. Off. . |
| 2437784 A1 | 8/1974 | Germany . |

*Primary Examiner*—Charles E. Cooley
*Attorney, Agent, or Firm*—Limbach & Limbach L.L.P.

[57] ABSTRACT

A machine for continuous kneading, having at least one rotating shaft along which paddles are mounted, wherein notched feed adjusting plates are mounted on each shaft. In some embodiments, each feed adjusting plate is a C-shaped plate having a notch of adjustable width. In other embodiments, the machine has two rotating shafts. One of the shafts rotates at relatively low speed; the other rotates at relatively high speed.

6 Claims, 5 Drawing Sheets

FIG. 25 { K1=1260.0  K2=1470.0 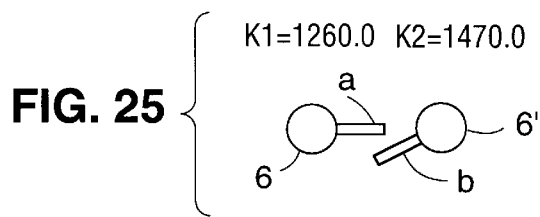
FIG. 30 { K1=1665.0  K2=1942.5 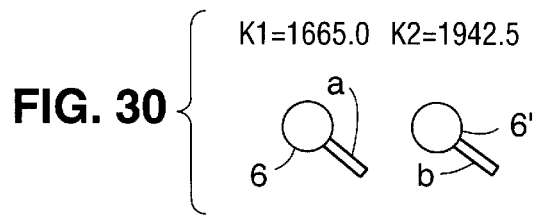
FIG. 26 { K1=1305.0  K2=1522.5 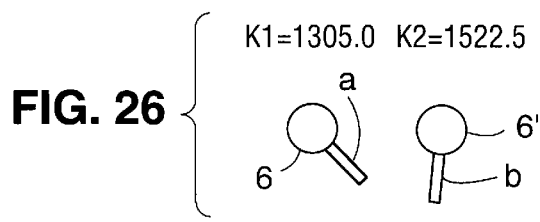
FIG. 31 { K1=1800.0  K2=2100.0 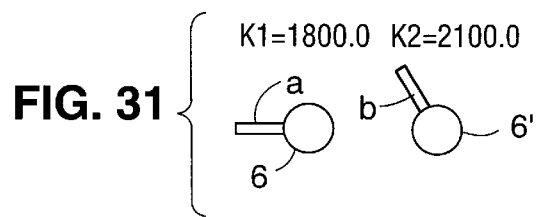
FIG. 27 { K1=1440.0  K2=1680.0 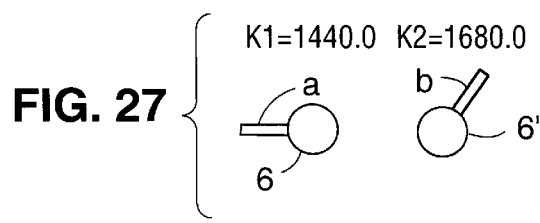
FIG. 32 { K1=1935.0  K2=2257.5 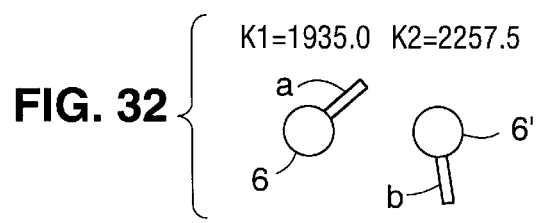
FIG. 28 { K1=1575.0  K2=1837.5 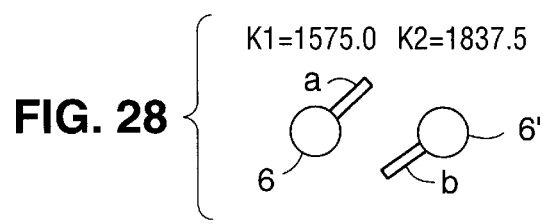
FIG. 33 { K1=1980.0  K2=2310.0 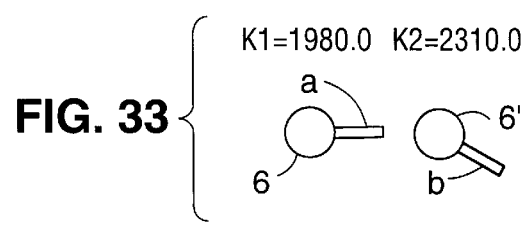
FIG. 29 { K1=1620.0  K2=1890.0 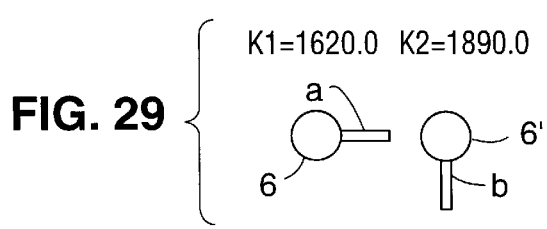
FIG. 34 { K1=2025.0  K2=2362.5 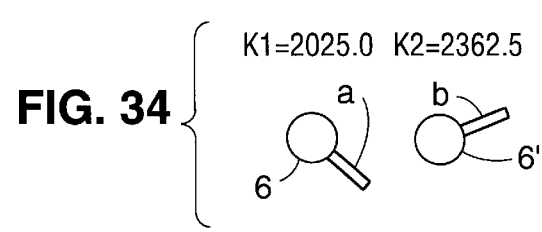

CONTINUOUS KNEADING MACHINE HAVING AT LEAST ONE ROTATING SHAFT AND PADDLES AND NOTCHED ADJUSTING PLATES MOUNTED ON EACH SHAFT

TECHNICAL FIELD

This invention relates to a kneader for continuously kneading and agitating powder and granular material by paddles mounted on one or more rotating shafts disposed horizontally in an oblong casing.

BACKGROUND ART

To secure an adequate degree of kneading or agitation in the conventional continuous kneader, powder and granular material of the largest amount possible must stay in the kneader, considering limited length and processing capability. To this end the supply of a powder and granular material to be fed to the raw-material-supplying part of the kneader should correspond to its processing capability. An excessive flow of the processed material, which occurs especially around its discharge outlet, also needs avoiding.

Regarding the supply of a constant amount of raw material, a variable-speed, constant-supply device is provided, or a fixed gate is provided to supply the raw material from the top of its casing. Regarding the excessive flow of the processed material, a so-called "return paddle," wherein the feed angle of the paddle is reversed, is provided around the discharge outlet, or a dam gate is provided at its discharge part.

The conventional kneader has drawbacks in that when a self-curing material is kneaded, the kneading efficiency is hindered by the kneaded material that adheres to the paddles and that cures thereon. To solve this problem an apparatus having a self-cleaning effect was disclosed in Japanese Patent Publication No. 62-44969.

However, those remedies proposed above still have some drawbacks. That is, the constant-supply device is expensive. The fixed gate has disadvantages in that its possible shapes are limited since any interference with the rotating shafts and paddles must be avoided, which results in a narrow range of adjustment, and in that it alone is unable to prevent excessive amounts of highly fluid powder and granular material from being fed into the kneading part, which results in an irregular kneading. Additionally, since none of the methods of providing a return paddle and of using the dam gate can completely discharge the processed material in the machine, a problem occurs in that the residual material fixedly adhering to the shafts and paddles hinders the machine from being easily restarted.

DISCLOSURE OF INVENTION

This invention, which is intended to solve the above problems, aims to provide a machine that can continuously knead and discharge a constant amount of fed powder and granular material without the need of an extra device, and which can knead and agitate the fed material while controlling the amount of material being processed, so as to discharge all of the processed material.

To solve the above problems, this invention of a machine that continuously kneads comprises an oblong casing having a supply inlet at one end and a discharge outlet at the other end, and one or two rotating shafts disposed in the casing, on which shaft kneading paddles are mounted. The machine is characterized by C-shaped adjusting plates whose radii substantially equal the distance from the axis of the rotating shaft to the bottom of the kneading part of the casing. Each of the plates has a given notch, and they are mounted on the shaft at the boundary between the supply part and the kneading part of the casing and at a position just in front of the outlet, respectively. Thus, a constant amount of powder and granular material can be fed into the kneading part from the feeding part, and the processed material can be completely discharged without any excessive amount of it being discharged from the kneading part.

In another embodiment of this invention, a sliding plate of a shape identical to that of the adjusting plates is placed over one or both of the adjusting plates, so that the sliding plate can be adjustably slid around the rotating shaft in the circumferential direction.

In a further embodiment of this invention, the ratio of the rotational speeds of the two rotating shafts is set at 6:7, and the kneading paddles are mounted on the low-speed and high-speed rotating shafts along their circumferential screw lines at a circular pitch of 90 and 105 degrees, respectively. Thus, the self-cleaning effect, as well as the kneading effect, of this invention, is enhanced by reducing the intervals between the rotating paddles, while abutments therebetween are prevented.

BRIEF DESCRIPTION OF DRAWINGS

FIGS. 5–34 show the relative positions of two corresponding paddles during rotation of the shafts.

BEST MODE FOR CARRYING OUT THE INVENTION

Figure 1:
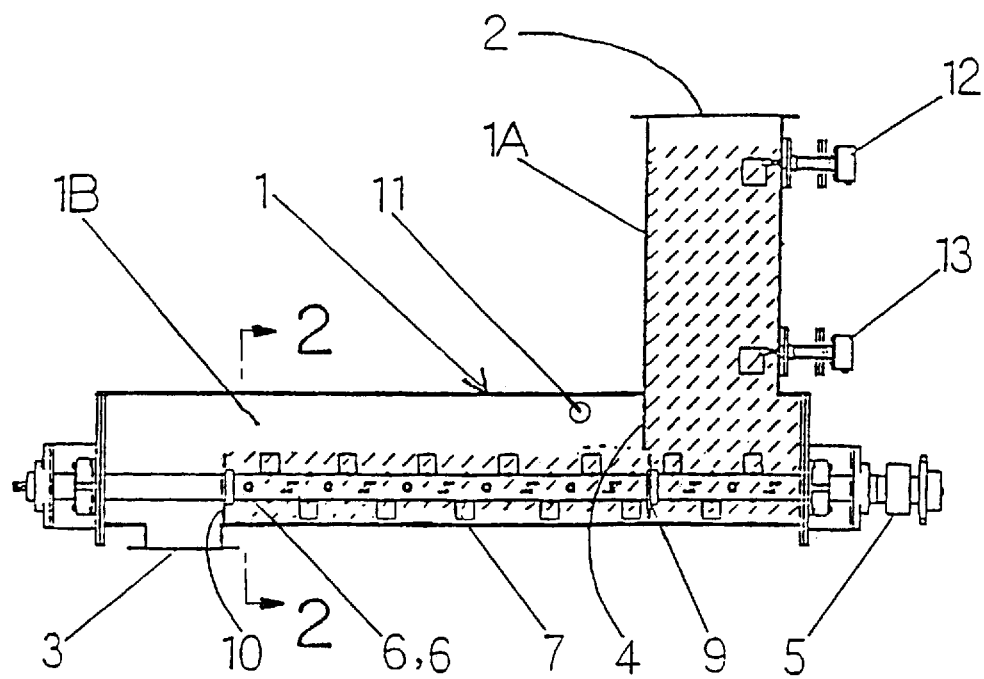
FIG. 1 is a frontal section of the main part of the machine for continuously kneading of this invention.
Figure 2:
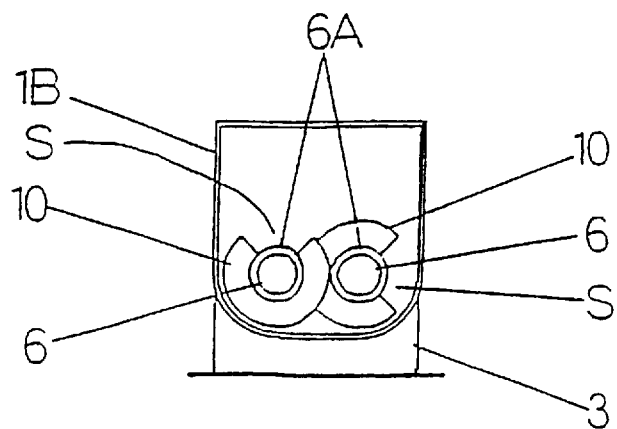
FIG. 2 is a section of FIG. 1 cut along line 2—2, and viewed from the direction indicated by arrows.

A first embodiment of this invention will now be described by reference to FIGS. 1–4. The machine for continuously kneading of this invention comprises a hopper-shaped feeding part 1A for receiving and supplying raw material, namely, powder and granular material such as fly ash thrown thereinto via an supply inlet 2, and a kneading part 1B, which is an oblong cylindrical casing 1 having a discharge outlet 3 at the bottom of one end of the casing. A fixed gate 4 is disposed at the boundary between the supply part 1A and kneading part 1B. Two shafts 6,6 are horizontally disposed in the kneading part 1B. One end of each shaft is connected to a motor 5 as a drive, the other end of which is rotatably pivoted.

Paddles 7, for kneading and transporting powder and granular material, are mounted on the rotating shafts 6,6 substantially over their whole length at a constant pitch along spirals oriented in the feeding direction. A C-shaped adjusting plate 9 for adjusting the feed of material, whose radius approximately equals the distance from the center of the shaft to the bottom of the casing 1, and having a fan-shaped notch S, is mounted via a mounting member 6A on each of the shafts 6,6 at a position a little upstream from the fixed gate 4. An adjusting plate 10, whose shape is just the same as that of the adjusting plate 9, for adjusting the amount of discharge, is also mounted via the mounting member 6A on each of the shafts 6,6 at a position upstream from the discharge outlet 3.

A water-supply opening 11 for adding water to the powder and granular material is provided in the inner wall of the kneading part 1B near the supply part 1A. An upper-level sensor 12 and a lower-level sensor 13 are mounted on the wall at the side of the motor of the supply part 1A, so as to sense the levels of material when the machine is started and stopped.

The operation of the thus-structured machine for continuously kneading will now be described. The machine is started when the upper level sensor 12 senses that the powder and granular material thrown from the supply inlet 2 into the feeding part 1A has filled the part up to the upper level. That is, the shafts 6,6 are rotated by driving the motor 5, and the fed material begins to be kneaded while being fed into the kneading part 1B. At this time, the feed of material is regulated by the fixed gate 4 and feed-adjusting plate 9 such that, at first, material is fed through the notch S of the adjusting plate 9 and rotated along with the shafts 6,6. Namely, material is fed through the entire part of the adjusting plate 9 into the kneading part 1B. Since the feed by the paddles 7 is less than that of the material fed through the notch S, powder and granular material accumulate slowly in the kneading part 1B so that the feed into the kneading part 1B decreases gradually by a check caused by the accumulated material.

When a certain period has passed after kneading starts, the surface level of the powder and granular material in the kneading part 1B is stabilized at around the level of the lower surface of the fixed gate 4. After that, the feed of material to be fed into the kneading part 1B equals that of the material transported by the paddles 7, so that a stable feed is maintained. Since the effect of the pressure of the powder and granular material in the feeding part 1A on the feed of material can be reduced by providing an L-shaped fixed gate with its horizontal part projecting into the side of the kneading part 1B, a more stable feed can be achieved.

When powder and granular material have been transported to a position near the discharge outlet 3, the amount of accumulated material gradually increases. This is because if the amount of the accumulated powder and granular material in the kneading part 1B is small, the material is discharged by being intermittently passed through the notch S, since the adjusting plate 10 rotates along with the rotating shafts 6,6. As the level of the material goes up due to the increase in the accumulated material, the discharge of powder and granular material from the discharge outlet 3 becomes almost a continuous one. This results in an increase in the amount of the discharge.

If the amount of the powder and granular material thrown into the feeding part 1A continues decreasing by the continuation of such a discharge, the drive motor 5 stops by the action of the lower-level sensor 13, and the discharge of the material also stops. At this time, substantially all the powder and granular material in the kneading part 1B can be discharged by stopping the drive motor 5 for a certain time after the operation of the lower-level sensor 13.

Figure 3:
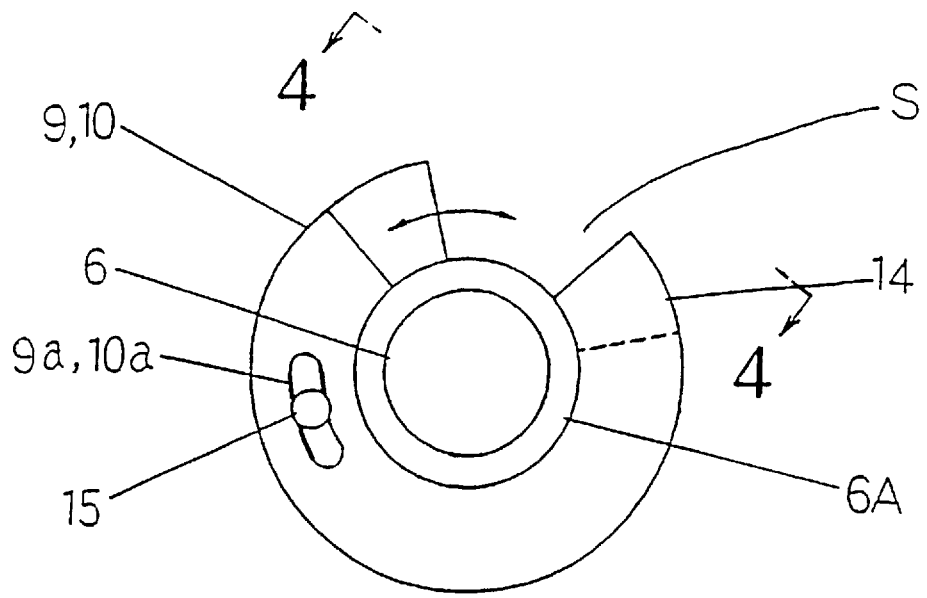
FIG. 3 is a plan view showing a sliding plate mounted on each of the feed- and discharge-adjusting plates.
Figure 4:
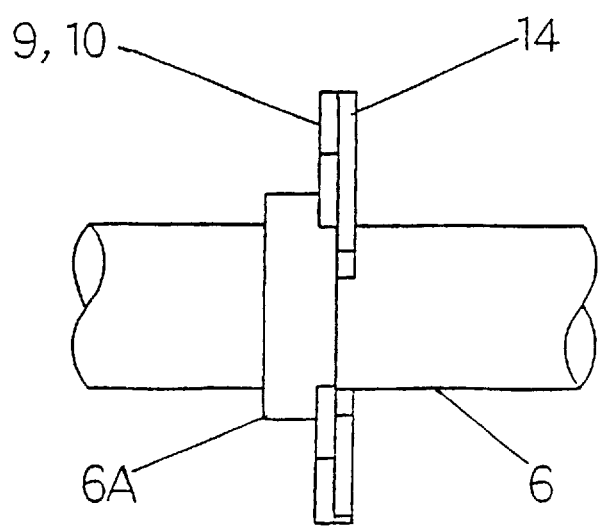
FIG. 4 is a side view of FIG. 3 viewed from the direction indicated by arrows 4—4.
Figure 5:
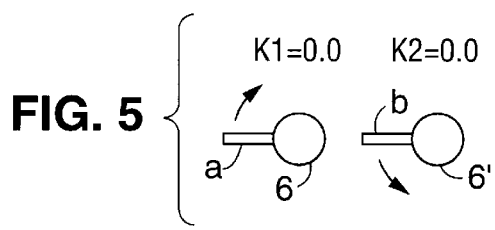
Figure 10:
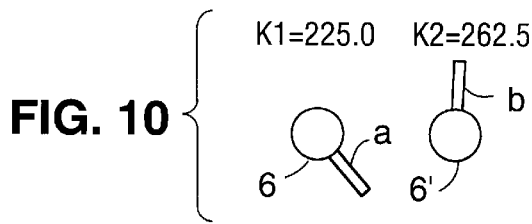
Figure 6:
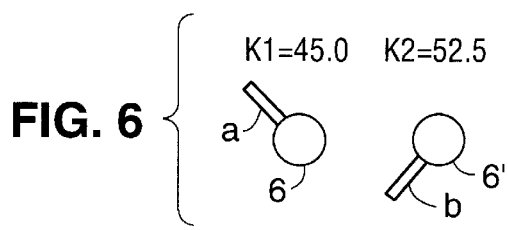
Figure 11:
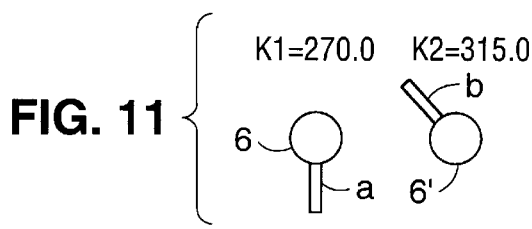
Figure 7:
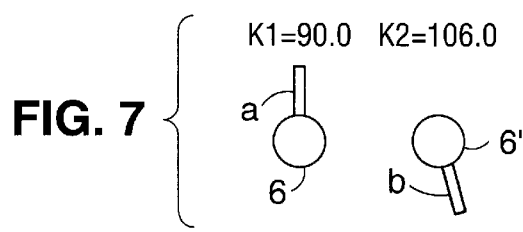
Figure 12:
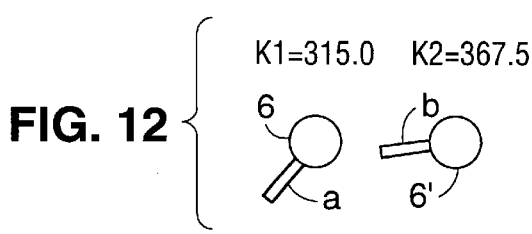
Figure 8:
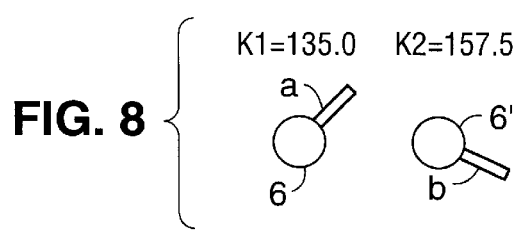
Figure 13:
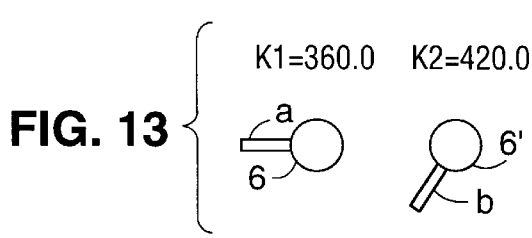
Figure 9:
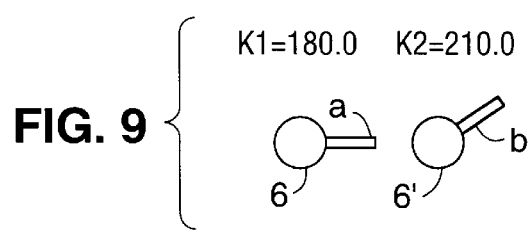
Figure 14:
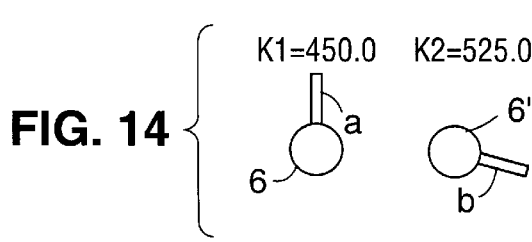
Figure 15:
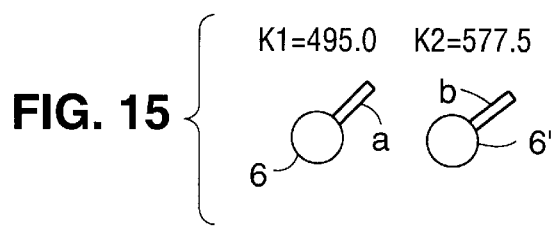
Figure 20:
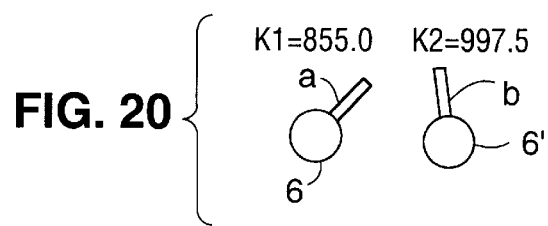
Figure 16:
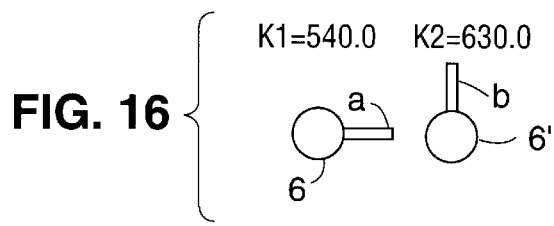

In a second embodiment of this invention, as in FIGS. 3 and 4, the size of the notch S can be adjusted within a given range as follows: an oblong hole 9a,10a is provided in each of the feed- and discharge-adjusting plates 9,10 along its circumferential direction; a sliding plate 14, having a shape identical to the adjusting plates 9,10, is attached thereto through a bolt 15, which passes through the oblong hole 9a,10a and a threaded hole provided in the sliding plate 14; the sliding plate 14 can be slid relative to each of the adjusting plates 9,10 by loosening the bolt 15 so as to adjust the size of the notch S. The sliding plate 14 in the second embodiment may be attached to just one of the adjusting plates 9 and 10.

Figure 21:
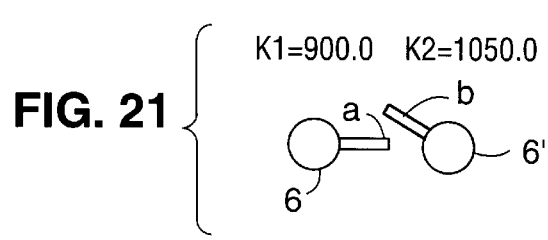
Figure 17:
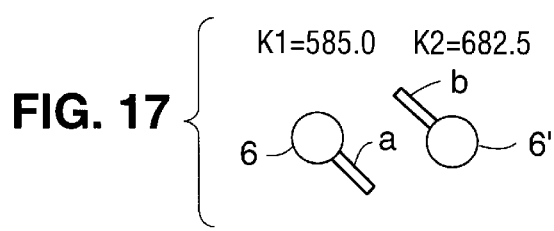
Figure 22:
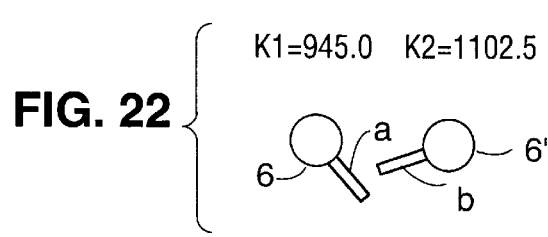
Figure 18:
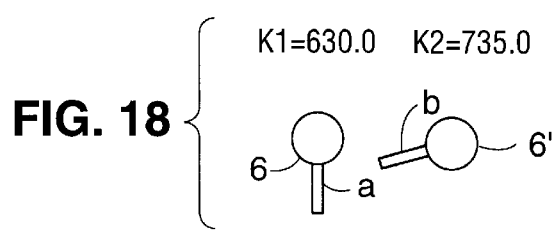
Figure 23:
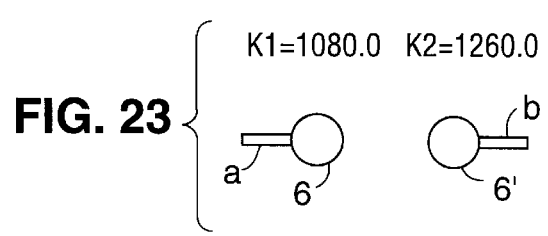
Figure 19:
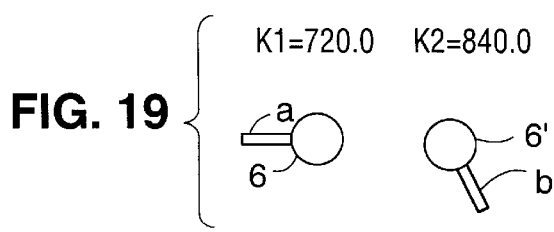
Figure 24:
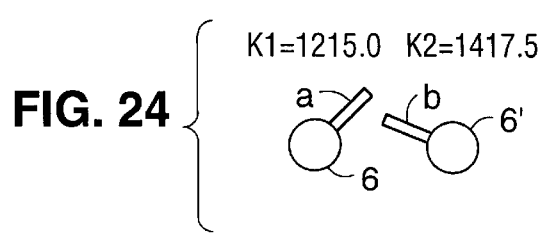

A third embodiment of this invention will now be described by reference to FIGS. 5–34 The ratio of the rotational speeds of the two rotating shafts 6,6' is empirically set at 6:7. Based on our experiments kneading paddles a, b are also mounted on the low-speed and high-speed rotating shafts 6,6' along their circumferential screw lines at a circular pitch of 90 and 105 degrees, respectively. To simplify the explanations for both shafts only one paddle for each shaft is shown in each of FIGS. 5–34. Each of FIGS. 5–34 shows the relative positions of two corresponding paddles a, b, including when they near each other, represented by accumulated angles for every 45 degrees of the rotation of a paddle a, during six rotations of the shaft 6 (corresponding to seven rotations of the shaft 6'). The first to sixth rotations of the shaft 6 are represented by numbers FIGS. 5–13, 14–19, 20–23, 24, 27, 28–31 and 32–34, respectively. As can be seen, for example, from FIGS. 21 and 22, the rear part of the paddle a and the front part of the paddle b sometimes pass near each other, while their abutment is securely avoided. This results in an increased self-cleaning effect as well as enhanced kneading efficiency.

INDUSTRIAL APPLICABILITY

From the above descriptions it can be clearly seen that the simple kneading machine of this invention, equipped with inventive adjusting plates with a sliding plate, can stably knead and discharge a constant amount of fed powder and granular materal by effectively controlling the amount of material being processed so as to completely discharge the processed material. Additionally, since the ratio of the rotational speeds of the two rotating shafts 6,6' is set at 6:7, and since the kneading paddles are mounted on their respective shafts along their circumferential screw lines at a circular pitch of 90 and 105 degrees, the self-cleaning effects, as well as the kneading efficiency, of the machine are greatly improved.

What is claimed is:

1. A machine for continuously kneading, comprising:
    a supply part;
    an oblong casing having a supply inlet at one end in a position for receiving a substance from the supply part, a discharge outlet at the other end, and a kneading part between the supply inlet and the discharge outlet, the kneading part having a bottom;
    at least one rotating shaft disposed in the casing, the shaft having an axis which is separated from the bottom of the kneading part by a first distance; kneading paddles mounted on the shaft and C-shaped adjusting plates mounted on said shaft wherein each of the adjusting plates has a radius substantially equal to the first distance each of the plates has a notch of a given shape, one of the plates is mounted on the shaft at the boundary between the supply part and the kneading part, and another of the plates is mounted on said shaft at a position just in front of the discharge outlet.

2. The machine of claim 1, wherein a sliding plate of a shape identical to the shape of at least one of the adjusting plates is placed over said one of the adjusting plates, so that the sliding plate can be adjustably slid around the rotating shaft in a circumferential direction.

3. A machine for continuously kneading, comprising:
    a supply part;
    an oblong casing having a supply inlet at one end in a position for receiving a substance from the supply part, a discharge outlet at the other end, and a kneading part between the supply inlet and the discharge outlet, the kneading part having a bottom;

two rotating shafts disposed in the casing, each of the shafts having an axis which is separated from the bottom of the kneading part by a first distance;

kneading paddles mounted on each of the shafts and C-shaped adjusting plates mounted on each of the shafts, wherein each of the adjusting plates has a radius substantially equal to the first distance, each of the plates has a notch of a given shape, one of the plates is mounted on one of the shafts at the boundary between the supply part and the kneading part, and another of the plates is mounted on said one of the shafts at a position just in front of the discharge outlet.

4. The machine of claim 3, wherein the rotating shafts disposed in the casing include a low-speed rotating shaft and a high-speed rotating shaft, wherein the ratio of the rotational speeds of the rotating shafts is set at 6:7, and wherein the kneading paddles are mounted on the low-speed rotating shaft and the high-speed rotating shaft along circumferential screw lines at circular pitches of 90 and 105 degrees, respectively.

5. The machine of claim 3, wherein a sliding plate, having a shape identical to the shape of at least one of the adjusting plates mounted on one of the shafts, is placed over said one of the adjusting plates, so that the sliding plate can be adjustably slid around said one of the shafts in a circumferential direction.

6. The machine of claim 5, wherein the rotating shafts include a low-speed rotating shaft and a high-speed rotating shaft, wherein the ratio of the rotational speeds of the rotating shafts is set at 6:7, and wherein the kneading paddles are mounted on the low-speed rotating shaft and the high-speed rotating shaft along circumferential screw lines at circular pitches of 90 and 105 degrees, respectively.

* * * * *